(12) United States Patent
Tanaka (10) Patent No.: US 10,234,946 B2
(45) Date of Patent: Mar. 19, 2019

(54) INPUT DEVICE AND CONTROL METHOD OF INPUT DEVICE

(71) Applicant: FUJITSU TEN LIMITED, Kobe-shi, Hyogo (JP)

(72) Inventor: Takashi Tanaka, Kobe (JP)

(73) Assignee: FUJITSU TEN LIMITED, Kobe-shi (JP)

( * ) Notice: Subject to any disclaimer, the term of this patent is extended or adjusted under 35 U.S.C. 154(b) by 0 days.

(21) Appl. No.: 15/358,972

(22) Filed: Nov. 22, 2016

(65) Prior Publication Data

US 2017/0185153 A1 Jun. 29, 2017

(30) Foreign Application Priority Data

Dec. 25, 2015 (JP) ................. 2015-254840

(51) Int. Cl.
*G06F 3/01* (2006.01)
*G06F 3/0488* (2013.01)

(52) U.S. Cl.
CPC ............ *G06F 3/016* (2013.01); *G06F 3/0488* (2013.01); *B60K 2350/1032* (2013.01)

(58) Field of Classification Search
CPC G06F 3/016; G06F 3/0488; B60K 2350/1032
See application file for complete search history.

(56) References Cited

U.S. PATENT DOCUMENTS

| | | | | |
|---|---|---|---|---|
| 2009/0259359 A1* | 10/2009 | Whitton | .................. | G05G 5/03 701/31.4 |
| 2013/0050112 A1* | 2/2013 | Vanhelle | ................ | B60K 37/06 345/173 |
| 2014/0118127 A1* | 5/2014 | Levesque | ................ | G06F 3/016 340/407.2 |
| 2014/0253302 A1* | 9/2014 | Levesque | ................ | G08B 6/00 340/407.1 |
| 2016/0031444 A1* | 2/2016 | Fairgrieve | ............ | B22D 21/005 701/93 |
| 2017/0021762 A1* | 1/2017 | Daman | .................... | B60Q 9/00 |
| 2017/0146358 A1* | 5/2017 | Ward | ..................... | G06F 3/016 |

FOREIGN PATENT DOCUMENTS

JP 2013-235614 A 11/2013

* cited by examiner

*Primary Examiner* — Brian Wilson
(74) *Attorney, Agent, or Firm* — Oliff PLC

(57) ABSTRACT

An input device according to an embodiment includes a vibration element, an acquisition unit, and an element controller. The vibration element causes an operation surface to vibrate. The acquisition unit acquires information on at least one of a traveling state and a traveling environment of the moving body. The element controller causes the vibration element to vibrate at a vibration strength according to at least the one of the traveling state and the traveling environment.

11 Claims, 9 Drawing Sheets

| TOUCH AREA | DRIVE VOLTAGE |
|---|---|
| AREA A1 | X |
| AREA A2 | Y |
| OTHERS | Z |
| ⋮ | ⋮ |

| LOAD INFORMATION | ADJUSTMENT VALUE |
|---|---|
| ORDINARY ROAD/ EXPRESSWAY | 1 |
| PRIVATE ROAD/ MOUNTAIN ROAD | 3 |
| RAILWAY CROSSING | 4 |
| ⋮ | ⋮ |

INPUT DEVICE AND CONTROL METHOD OF INPUT DEVICE

CROSS-REFERENCE TO RELATED APPLICATION

This application is based upon and claims the benefit of priority of the prior Japanese Patent Application No. 2015-254840, filed on Dec. 25, 2015, the entire contents of which are incorporated herein by reference.

FIELD

The embodiments discussed herein are directed to an input device and a control method of the input device.

BACKGROUND

Conventionally, there is known an input device that announces acceptance of input by giving vibration to a user. The input device generates the vibration in accordance with, for example, pressure force by the user, so as to announce the acceptance of input to the user (for example, Japanese Laid-open Patent Publication No. 2013-235614).

However, with regard to the conventional input device, an environment in which the device is used is not considered. Therefore, for example, when the device is used in a moving body such as a vehicle, the input device may not be able to give appropriate vibration to a user.

SUMMARY

An input device according to an embodiment includes a vibration element, an acquisition unit, and an element controller. The vibration element causes an operation surface to vibrate. The acquisition unit acquires information on at least one of a traveling state and a traveling environment of the moving body. The element controller causes the vibration element to vibrate at a vibration strength according to at least the one of the traveling state and the traveling environment.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF EMBODIMENTS

Hereinafter, an input device and a control method of the input device disclosed in the present application will be described in detail with reference to the accompanying drawings. In the following explanation, the case in which a moving body is a vehicle will be described. However, the moving body may be a train, an airplane, a bicycle, or the like. Moreover, it is not intended that this invention be limited to the embodiments described below.

Figure 1A:
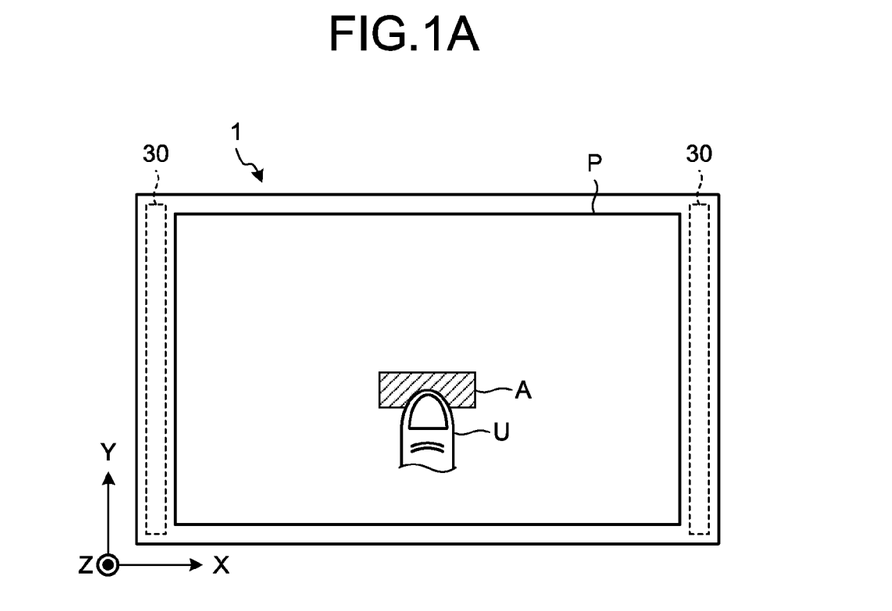
FIG. 1A is a schematic view illustrating an input device according to a first embodiment.
Figure 1B:
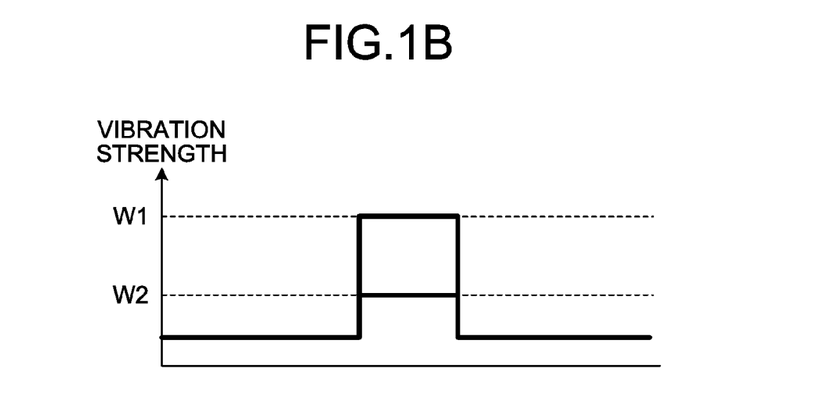
FIG. 1B is a schematic view illustrating a control method of the input device according to the first embodiment.

First, the outline of an input device according to the present embodiment will be explained with reference to FIGS. 1A and 1B. FIG. 1A is a schematic view illustrating an input device 1 according to the present embodiment. FIG. 1B is a schematic view illustrating a control method of the input device 1 according to the present embodiment. In the following explanation, it is assumed that the input device 1 is mounted on, for example, a vehicle 100 (not illustrated) to function as an input device of a navigation device.

As illustrated in FIG. 1A, the input device 1 includes an operation surface P and a vibration element 30 that vibrates the operation surface P. The operation surface P is constituted of a panel having, for example, an information inputting function of an electrostatic capacitance type. When a user touches the operation surface P with a finger U or a pointing device such as a stylus pen, the input device 1 detects a touch position of the user on the operation surface P.

The vibration element 30 is, for example, a piezoelectric element to vibrate the operation surface P by vibrating itself in accordance with input voltage. For example, when the finger U of the user holds down an area A illustrated in FIG. 1A, the input device 1 causes the vibration element 30 to vibrate. The operation surface P vibrates in accordance with the vibration of the vibration element 30, and thus the input device 1 can give vibration to the finger U of the user.

The input device 1 adjusts the voltage (hereinafter, referred to as "drive voltage"), which drives the vibration element 30, to adjust vibration strength of the vibration element 30. Specifically, when the drive voltage is high, the vibration strength of the vibration element 30 is large. On the other hand, when the drive voltage is low, the vibration strength of the vibration element 30 is small. Because the vibration strength of the operation surface P varies in accordance with the vibration strength of the vibration element 30, when the vibration strength of the vibration element 30 is large, the user can easily detect the vibration of the operation surface P.

As described above, the input device 1 is mounted on the vehicle 100. Therefore, for example, when the vehicle 100 vibrates with its movement or the like, the user getting in the vehicle 100 and the input device 1 also vibrate. Therefore, in such a case that the input device 1 is operated in the vibrating vehicle 100, the user hardly detects the vibration of the operation surface P.

Therefore, the input device 1 according to the present embodiment acquires information on at least one of a traveling state and a traveling environment of the vehicle 100, and adjusts the vibration strength of the vibration element 30 in accordance with the traveling state or the traveling environment. As a result, the input device 1 can give appropriate vibration to the user even when used in a moving body. The traveling state here means, for example, a state in which the vehicle 100 travels or stops, a state in which the vehicle 100 vibrates with its traveling, etc. Moreover, the traveling environment here means, for example, a situation of a load on which the vehicle 100 travels, the weather at traveling, etc.

For example, when the vehicle 100 is stopping, the input device 1 acquires "stop" as the information on the traveling state. In this case, because the vehicle 100 does not vibrate, the input device 1 adjusts the drive voltage so that the vibration element 30 vibrates at vibration strength W2 illustrated in FIG. 1B.

On the other hand, for example, when the vehicle 100 is traveling, the input device 1 acquires "travel" as the information on the traveling state. In this case, because the vehicle 100 vibrates, the input device 1 adjusts the drive voltage so that the vibration element 30 vibrates at vibration strength W1 that is larger than the vibration strength W2.

In this way, when the vehicle 100 vibrates in accordance with at least one of the traveling state and the traveling environment of the vehicle 100, the input device 1 adjusts the drive voltage so that the vibration strength of the vibration element 30 becomes large. When the vibration strength of the vibration element 30 becomes large, because the vibration strength of the operation surface P also becomes large, the user can easily detect the vibration of the operation surface P. As a result, the input device 1 can give appropriate vibration to the user even used in the vehicle 100.

Moreover, because the vibration strength of the vibration element 30 is adjusted in accordance with the drive voltage, the input device 1 adjusts the drive voltage in accordance with at least one of the traveling state and the traveling environment, and thus the vibration strength of the vibration element 30 can be adjusted precisely.

The case is here explained, in which the input device 1 acquires the information on stopping/traveling of the vehicle 100 as the information on the traveling state and the traveling environment, however, the traveling state and the traveling environment are not limited thereto. The information on the traveling state and the traveling environment may be the information on, for example, a state in which the vehicle 100 vibrates by its idling or the like, a paved situation of a load, etc.

Hereinafter, the case will be explained as the first embodiment, in which the input device 1 acquires speed of the vehicle 100 as the information on the traveling state.

First Embodiment

Figure 2:
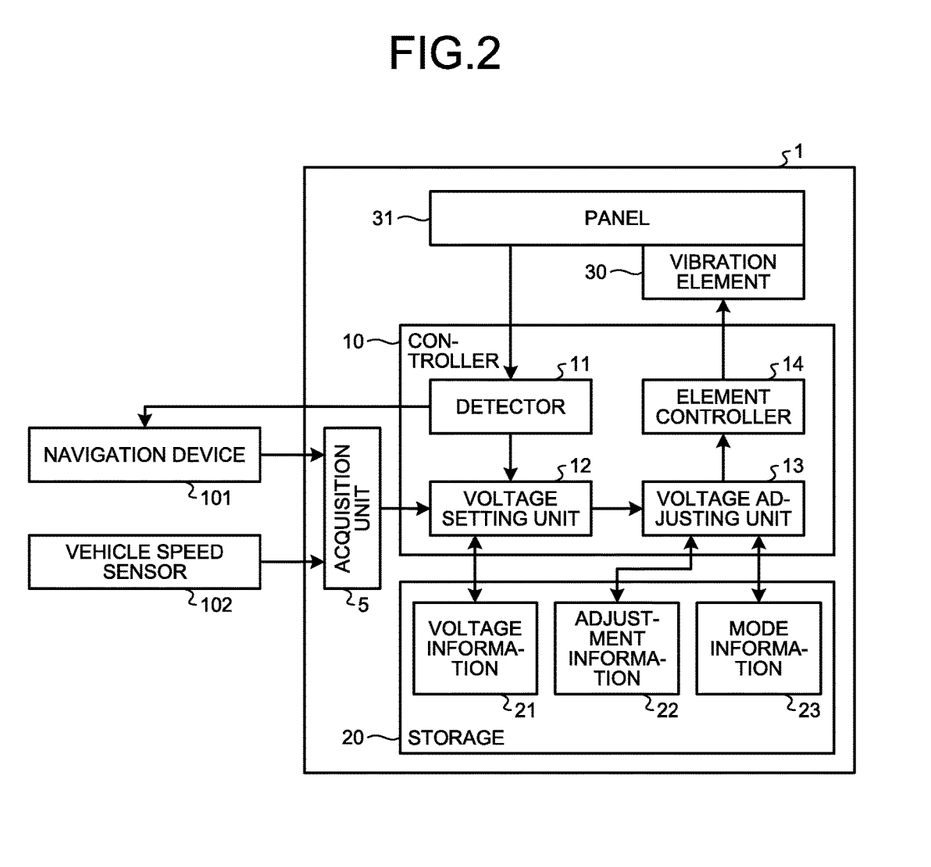
FIG. 2 is a block diagram illustrating a configuration example of the input device according to the first embodiment.

First, a configuration example of the input device 1 according to the first embodiment will be explained with reference to FIG. 2. FIG. 2 is a block diagram illustrating the configuration example of the input device 1 according to the first embodiment. As illustrated in FIG. 2, the input device 1 includes an acquisition unit 5, a controller 10, a storage 20, the vibration element 30, and a panel 31. Moreover, the input device 1 is connected to a navigation device 101 and a vehicle speed sensor 102 provided in the vehicle 100.

The navigation device 101 includes a display unit (not illustrated), and has navigational and audio functions when the vehicle 100 is driven by a driver (user) thereof. The navigation device 101 causes the display unit (not illustrated) to display images to execute the navigation functions. Moreover, the navigation device 101 outputs to the input device 1 information on the images that are displayed on the display unit.

The vehicle speed sensor 102 detects the traveling speed of the vehicle 100, and outputs to the input device 1 the information (hereinafter, referred to as "traveling speed information") on the detected traveling speed.

The panel 31 of the input device 1 includes, for example, a planar sensor (not illustrated) such as a touch-pad, and further includes the operation surface P that accepts an input operation by a user such as a touch operation. When the user touches the operation surface P, the panel 31 outputs to the controller 10 a sensor value according to the touch position of the user.

The vibration element 30 is, for example, a piezoelectric actuator such as a piezoelectric element. The vibration element 30 expands and contracts in accordance with drive voltage that is input from the controller 10 to vibrate the panel 31. The vibration element 30 is, for example, an element that causes the operation surface P to vibrate ultrasonically, however, the vibration element 30 may cause the operation surface P to vibrate at frequencies other than those of ultrasonic waves. Moreover, the vibration element 30 is arranged so that it contacts with the panel 31. The number of the vibration element 30 may be one or more.

The acquisition unit 5 acquires, from the vehicle speed sensor 102, information on at least one of the traveling state and the traveling environment of the vehicle 100. The acquisition unit 5 here acquires the traveling speed information on the vehicle 100 as the information on at least one of the traveling state and the traveling environment. The acquisition unit 5 further acquires the information on images from the navigation device 101. Moreover, the acquisition unit 5 outputs to the controller 10 the information on the acquired traveling speed information and the acquired images.

The controller 10 controls the vibration of the panel 31 by controlling, for example, the vibration element 30. The controller 10 includes a detector 11, a voltage setting unit 12, a voltage adjusting unit 13, and an element controller 14. The controller 10 is a microcomputer that includes, for example, a Central Processing Unit (CPU), a Random Access Memory (RAM), and a Read Only Memory (ROM). The CPU functions as the aforementioned detector 11, the voltage setting unit 12, the voltage adjusting unit 13, and the element controller 14, by performing, for example, an operation process in accordance with a program previously stored in the ROM.

The detector 11 detects the touch position of the user on the operation surface P on the basis of a sensor value input from the panel 31, and generates information on the detected touch position (hereinafter, referred to as "touch position information"). The detector 11 outputs the generated touch-position information to the voltage setting unit 12 and the navigation device 101.

The detector 11 detects the touch position of the finger U of the user, for example, in a predetermined period. As a result, even when the finger U moves on the operation surface P to vary the touch position, the detector 11 can detect the touch position following the variation.

The voltage setting unit 12 sets drive voltage in accordance with the touch position of the user on the operation surface P. In other words, the voltage setting unit 12 sets the drive voltage so that the vibration element 30 vibrates at vibration strength corresponding to the touch position of the user. For example, the voltage setting unit 12 sets the drive voltage so that the vibration element 30 vibrates at the vibration strength that differs from the predetermined areas A1 and A2 (see FIG. 3B) of the operation surface P.

Specifically, the voltage setting unit 12 sets the drive voltage on the basis of, for example, the touch position information that is input from the detector 11 and a voltage information 21 that is previously stored in the storage 20. Now, the voltage information 21 is information in which the predetermined areas A1 and A2 of the operation surface P are associated with the drive voltage, and is, for example, information that is decided in accordance with an image or the like to be displayed on the display unit of the navigation device 101.

Figure 3A:
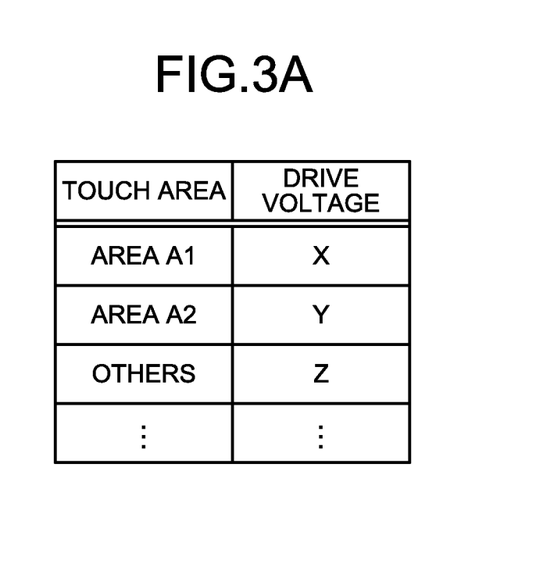
FIG. 3A is a diagram illustrating an example of voltage information.
Figure 3B:
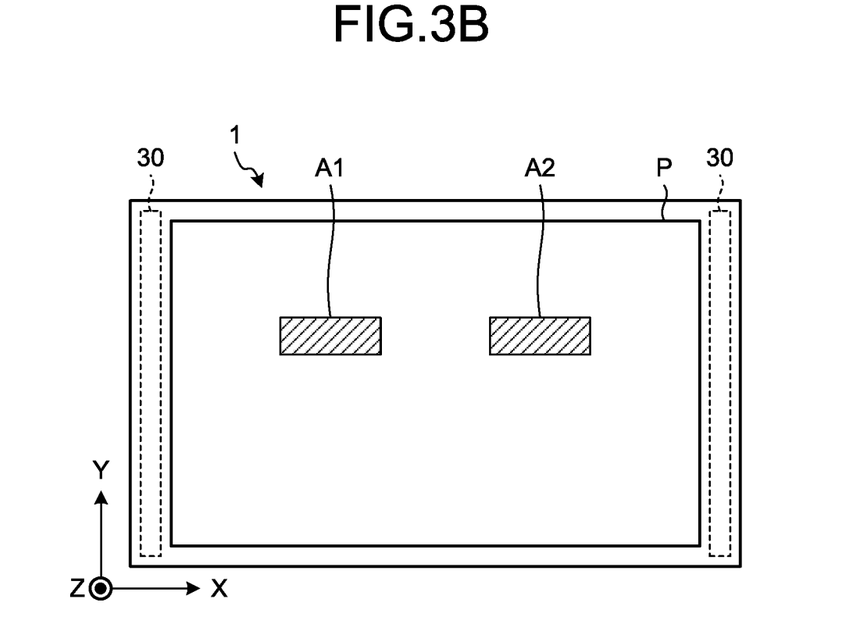
FIG. 3B is a diagram illustrating the voltage information.

A specific example of the voltage information 21 will be explained with reference to FIGS. 3A and 3B. FIG. 3A is a diagram illustrating an example of the voltage information 21. FIG. 3B is a diagram illustrating the voltage information 21. As illustrated in FIG. 3A, the voltage information 21 is information in which "touch area" and "drive voltage" are associated with each other.

"Touch area" is a predetermined area on the operation surface P, and is, for example, the areas A1 and A2 (see FIG. 3B), an area of "others" (for example, area other than the areas A1 and A2 in FIG. 3B) illustrated in FIG. 3A, etc. "Drive voltage" is the drive voltage that corresponds to "touch area". In an example illustrated in FIG. 3A, "X", "Y", and "Z" are set, as "drive voltage", to correspond to "area A1", "area A2", and "others", respectively.

The voltage setting unit 12 verifies which area of "touch area" in the voltage information 21 the touch position on the operation surface P is included on the basis of the touch position information input from the detector 11, and outputs to the voltage adjusting unit 13 the value of "drive voltage" corresponding to the verified area.

In this way, the voltage setting unit 12 varies the vibration strength of the vibration element 30 in accordance with the touch area, and thus the user can recognize which area of the operation surface P the user touches.

The voltage adjusting unit 13 adjusts the drive voltage that is set by the voltage setting unit 12 so that the vibration element 30 vibrates at the vibration strength according to at least one of the traveling state and the traveling environment. The voltage adjusting unit 13 here adjusts the drive voltage using, as the information on the traveling state and the traveling environment, the traveling speed of the vehicle 100. Specifically, the voltage adjusting unit 13 adjusts the drive voltage that is set by the voltage setting unit 12 on the basis of, for example, the traveling speed information that is input from the vehicle speed sensor 102 and adjustment information 22 that is stored in the storage 20.

Figure 4:
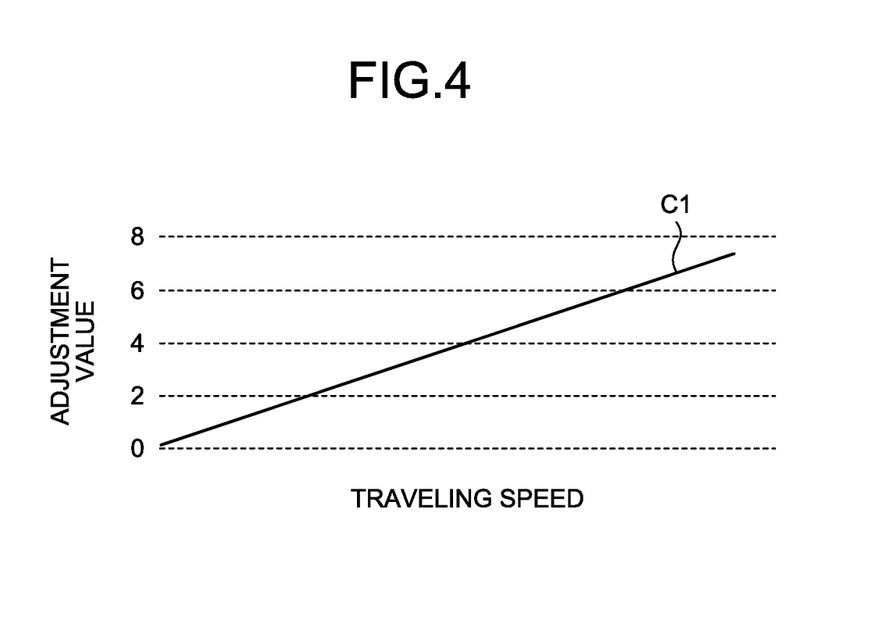
FIG. 4 is a diagram illustrating an example of adjustment information according to the first embodiment.

The adjustment information 22 will be explained with reference to FIG. 4. FIG. 4 is a diagram illustrating an example of adjustment information 22 according to the first embodiment. The adjustment information 22 is information in which the adjustment value of the drive voltage and the traveling speed of the vehicle 100 are associated with each other. For example, the adjustment information 22 is a function that indicates the relation between the adjustment value and the traveling speed. In an example illustrated in FIG. 4, the adjustment information 22 includes a function C1 in which the adjustment value is larger as the traveling speed is faster, in other words, the adjustment value and the traveling speed are in proportional relationship. In FIG. 4, the vertical axis indicates "adjustment value", and the horizontal axis indicates "traveling speed". The voltage adjusting unit 13 varies the adjustment value in accordance with the present traveling speed of the vehicle 100.

Specifically, the voltage adjusting unit 13 adjusts the drive voltage by adding a value to the drive voltage in accordance with the adjustment value. For example, when the adjustment value illustrate in FIG. 4 is "1", the voltage adjusting unit 13 adds "0.5" volt to the drive voltage, when the adjustment value is "2", the voltage adjusting unit 13 adds "1" volt to the drive voltage. In other words, a value Vd that is added to the drive voltage by the voltage adjusting unit 13 is Vd=0.5×(adjustment value).

The voltage adjusting unit 13 outputs to the element controller 14 the value of the added drive voltage. In the aforementioned example, when the adjustment value is "0", for example, the value Vd to be added is also "0". In other words, for example, when the vehicle 100 is stopping, namely when the traveling speed is "0", the value Vd to be added is also "0".

This is because vibration (hereinafter, referred to as "road noise") is generated between the vehicle 100 and a road surface during traveling of the vehicle 100, however, the road noise is not generated during stopping of the vehicle 100. Therefore, the effect of the vibration of the vehicle 100 is so small that it can be neglected during stopping of the vehicle 100. Therefore, in this case, the voltage adjusting unit 13 adds the value Vd "0" to be added to the drive voltage, in other words, keeps from adjusting the drive voltage. As a result, the element controller 14 can cause the vibration element 30 to vibrate at the drive voltage that is set by the voltage setting unit 12.

The adjustment value during the stopping of the vehicle 100 is not necessary "0". This is because, even when the vehicle 100 is stopping, for example, is idling, the vibration of the vehicle 100 may not be neglected depending on a type of the vehicle.

Moreover, the voltage adjusting unit 13 adjusts the drive voltage so that the adjustment value is larger, in other words, the drive voltage is higher, as the traveling speed of the vehicle 100 is faster. This is because the vehicle 100 receives more road noise as the traveling speed is faster, and thus the vibration of the vehicle 100 becomes larger.

In this way, the voltage adjusting unit 13 adjusts the drive voltage so that the drive voltage of the vibration element 30 is higher as the traveling speed is faster and further the vibration of the vehicle 100 is larger. As a result, the vibration strength of the vibration element 30 is larger as the traveling speed is faster, and thus the vibration strength of the operation surface P is larger. Therefore, the input device 1 can give appropriate vibration to the user even when used in a moving body.

The relation between the adjustment value and the traveling speed is not limited to the aforementioned example. For example, the optimum relation may be derived by experiments or the like in accordance with a setting position of the input device 1 in the vehicle 100 or a vehicle type of the vehicle 100, and the relation between the adjustment value and the traveling speed may be set to be the derived relation. Moreover, in an adjusting method of the drive voltage to the adjustment value of the voltage adjusting unit 13, the drive voltage may be adjusted using a function of multiplication, subtraction, division, or a combination of them in addition to the aforementioned addition method. A table that illustrates the relation between the adjustment value and the traveling speed may be also used as the adjustment information 22.

The voltage adjusting unit 13 may adjust the drive voltage in such a state that the user does not touch the operation surface P with the finger U, in other words, the detector 11 does not detect the touch position. In other words, the voltage adjusting unit 13 may be caused to keep from adjusting the drive voltage in such a state that the user touches the operation surface P with the finger U.

This is because, if the voltage adjusting unit 13 adjusts the drive voltage of the vibration element 30 in such a state that the user touches the operation surface P with the finger U, the user possibly feels, for example, the drastic variation in the vibration strength of the operation surface P as uncomfortable feeling. Therefore, the voltage adjusting unit 13 can cause the user not to feel the uncomfortable feeling by adjusting the drive voltage in such a state that the user does not touch the operation surface P.

Also, the voltage adjusting unit 13 may adjust the drive voltage in accordance with the amount of variation in the traveling speed during a predetermined period. For example, the voltage adjusting unit 13 may calculate the amount of variation in the traveling speed in a predetermined period, and further may adjust the drive voltage to be high when the amount of variation in the traveling speed during the predetermined period exceeds a predetermined threshold value. As a result, when the vehicle 100 vibrates by a sudden acceleration, a sudden braking, or the like, because the vibration strength of the operation surface P becomes large independent of the present traveling speed of the vehicle 100, the input device 1 can give the appropriate vibration to the user.

Moreover, the voltage adjusting unit 13 may adjust the drive voltage on the basis of a sensor value of a steering angle sensor (not illustrated) of the vehicle 100. For example, when the voltage adjusting unit 13 calculates the amount of variation in the sensor value of the steering angle sensor in a predetermined period, and the calculated amount of variation is a predetermined threshold value or more, in other words, the vehicle 100 travels with a sudden steering, the voltage adjusting unit 13 may adjust the drive voltage to be high.

By the way, because pressure force of the operation surface P, the skin thickness of the finger U, etc. differ from each user, sensitivity for the vibration may also differ from each user. Therefore, if the drive voltage is merely adjusted in accordance with the traveling speed of the vehicle 100, some users may not detect the vibration appropriately.

Therefore, an adjustment rate of the vibration strength of the vibration element 30 may be varied depending on the user. Specifically, the input device 1 is configured to include a plurality of modes that include the adjustment rates, which differ from each other, of the vibration strength of the vibration element 30. The user performs a predetermined operation to the input device 1 to select the mode, and thus the adjustment rate is varied depending on the user. In this case, the voltage adjusting unit 13 adjusts the drive voltage at the adjustment rate corresponding to the selected mode.

The adjustment rate corresponds to the slope (amplification factor), which is corresponding to the adjustment information 22 illustrated in FIG. 4, of a function C1. The voltage adjusting unit 13 varies the slope (i.e. adjustment information 22) of the function in accordance with the mode selected by the user, and thus varies the adjustment rate of the drive voltage. Information, in which the mode and the function corresponding to the mode are associated, is stored in the storage 20 as mode information 23.

Figure 5:
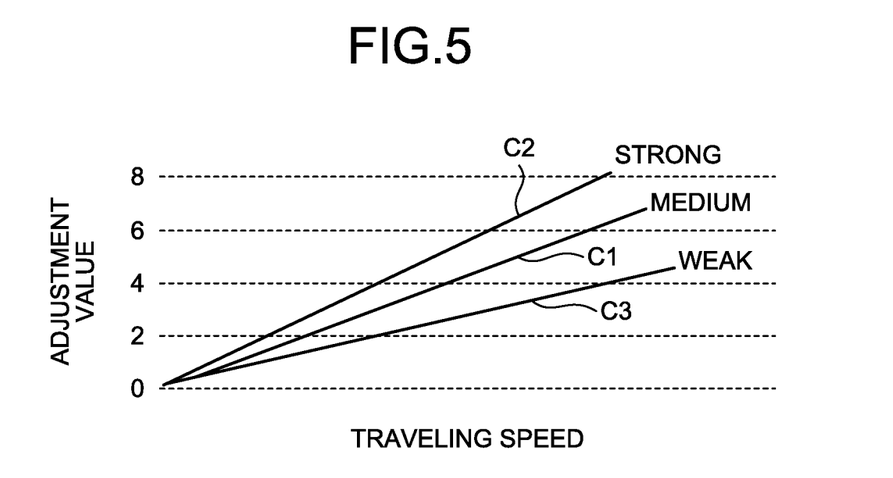
FIG. 5 is a diagram illustrating an example of mode information.

The mode information 23 will be here explained with reference to FIG. 5. FIG. 5 is a diagram illustrating an example of mode information 23. As illustrated in FIG. 5, the modes include, for example, three modes of "strong", "medium", and "weak".

When the mode is "medium", the voltage adjusting unit 13 selects the function C1. Information on the function C1 described here is assumed to be the same as that on the function C1 illustrated in FIG. 4. When the mode selected by the user is "strong", the voltage adjusting unit 13 selects a function C2. The function C2 is a function whose adjustment rate (i.e. slope) is larger than that of the function C1 illustrated in FIG. 4. Therefore, when the user selects "strong" as a mode, the voltage adjusting unit 13 adjusts the drive voltage to be higher adjustment value compared with the case of the "medium" mode, even if the vehicle 100 travels at the same traveling speed.

When the mode selected by the user is "weak", the voltage adjusting unit 13 selects a function C3. The function C3 is a function whose adjustment rate (i.e. slope) is smaller than those of the functions C1 and C2. Therefore, when the user selects "weak" as a mode, the voltage adjusting unit 13 adjusts the drive voltage to be lower adjustment value compared with the cases of the "strong" and "medium" modes even if the vehicle 100 travels at the same traveling speed.

In this way, the voltage adjusting unit 13 adjusts the drive voltage at the adjustment rate according to the mode selected by the user. As a result, the user can set the vibration strength of the operation surface P in accordance with his/her detection sensitivity or preference. The number of modes included in the mode information 23 is not limited to three. However, it may be two, four, or more. Moreover, the voltage adjusting unit 13 may use functions that differ in not only slope but also types with respect to each mode.

The element controller 14 causes the vibration element 30 to vibrate at the vibration strength according to at least one of the traveling state and the traveling environment of the vehicle 100. Specifically, the element controller 14 causes the vibration element 30 to vibrate at the value of the drive voltage, which is adjusted by the voltage adjusting unit 13 in accordance with at least one of the traveling state and the traveling environment of the vehicle 100.

The storage 20 stores, for example, the aforementioned voltage information 21, the adjustment information 22, and the mode information 23 as information needed for processing that is executed by the voltage setting unit 12 and the voltage adjusting unit 13, while storing various results of the processing. The storage 20 includes, for example, a semiconductor memory element such as a Random Access Memory (RAM) or a flash memory, or a storage device such as a hard disc or an optical disk.

Figure 6:
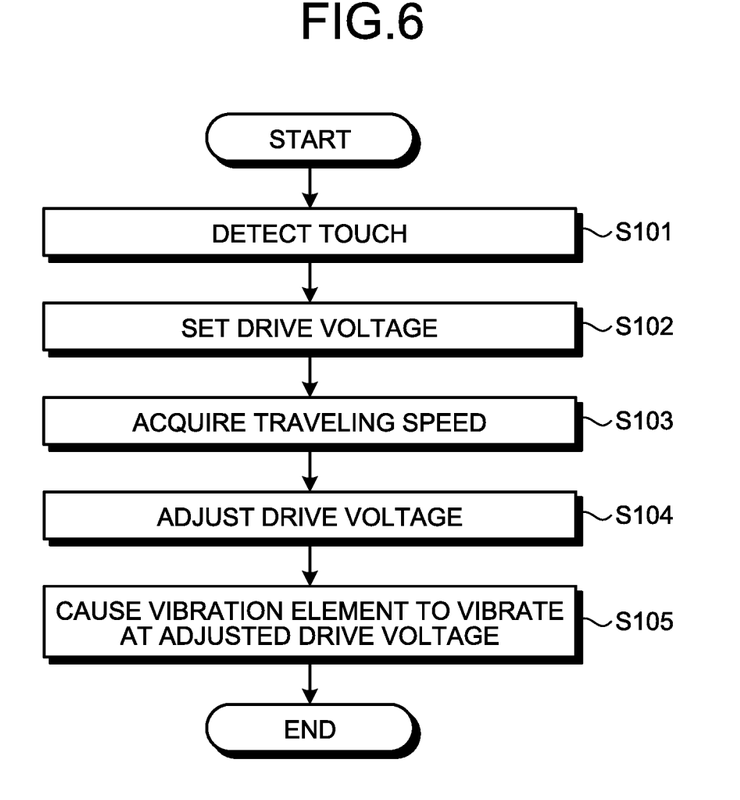
FIG. 6 is a flowchart illustrating a processing procedure that is executed by the input device according to the first embodiment.

Next, a processing procedure executed by the input device 1 according to the first embodiment will be explained with reference to FIG. 6. FIG. 6 is a flowchart illustrating a processing procedure that is executed by the input device 1 according to the first embodiment, and the procedure is executed repeatedly by the controller 10 of the input device 1.

As illustrated in FIG. 6, the detector 11 of the controller 10 detects the touch to the operation surface P (step S101), and then the voltage setting unit 12 sets the drive voltage of the vibration element 30 on the basis of the touch (step S102).

Next, the voltage adjusting unit 13 acquires present traveling speed information on the vehicle 100 using the acquisition unit 5 and the voltage setting unit (step S103). The voltage adjusting unit 13 adjusts the drive voltage on the basis of the traveling speed information (step S104). The element controller 14 causes the vibration element 30 to vibrate at the drive voltage adjusted by the voltage adjusting unit 13 (step S105). In other words, the element controller 14 causes the vibration element 30 to vibrate at the vibration strength according to the traveling speed.

As described above, the input device 1 according to the first embodiment includes the vibration element 30, the acquisition unit 5, and the element controller 14. The vibration element 30 causes the operation surface P to vibrate. The acquisition unit 5 acquires information on at least one of the traveling state and the traveling environment of a moving body. The element controller 14 causes the vibration element 30 to vibrate at the vibration strength according to at least one of the traveling state and the traveling environment.

Therefore, by employing the input device 1 according to the first embodiment, appropriate vibration can be given to the user even when used in a moving body. Moreover, with regard to the input device 1 according to the first embodiment, because the drive voltage is adjusted using the vehicle speed sensor 102 provided in the vehicle 100, a separate sensor or the like need not be provided, and thus an installation cost can be reduced.

By the way, the case is explained in the aforementioned embodiment, in which the input device 1 adjusts the vibration strength of the vibration element 30 in accordance with the traveling speed as information on at least one of the traveling state and the traveling environment of the vehicle 100. However, the input device 1 may also adjust the vibration strength of the vibration element 30 by the traveling state or the traveling environment other than the traveling speed.

Therefore, the case, in which the input device 1 adjusts the vibration strength of the vibration element 30 by the traveling state or the traveling environment other than the traveling speed, will be explained hereinafter as another embodiment. In the following description, parts same as those having already explained are denoted by identical reference symbols, and duplicate description will be omitted.

Second Embodiment

First, the case, in which an input device 2 acquires information on the vibration state accompanying the traveling state of the vehicle 100 as information on the traveling state and further causes the vibration element 30 to vibrate at the vibration strength according to the acquired information, will be explained as the second embodiment.

Figure 7:
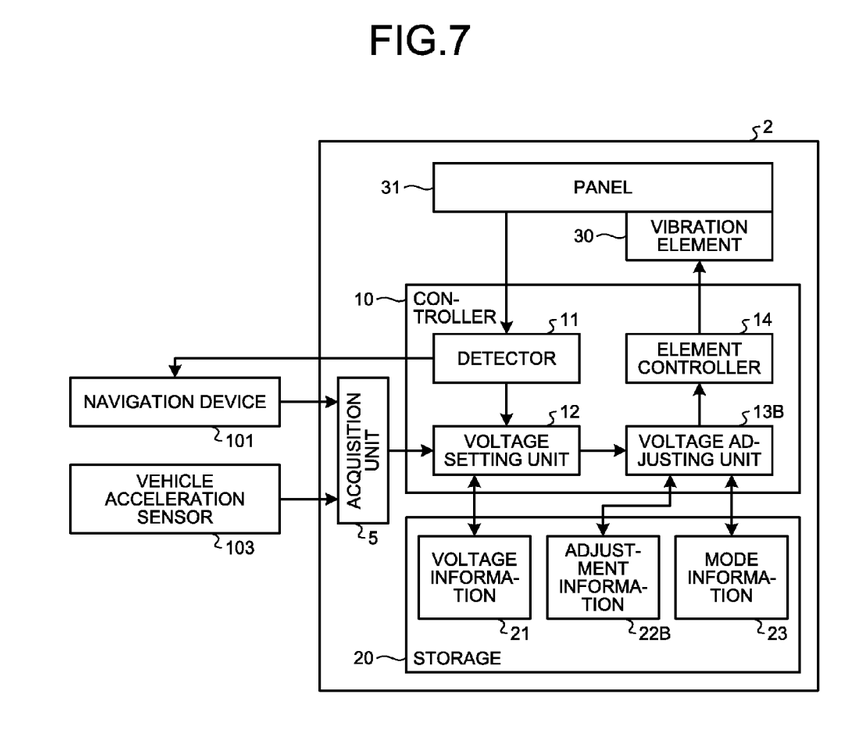
FIG. 7 is a block diagram illustrating a configuration example of an input device according to a second embodiment.
Figure 8:
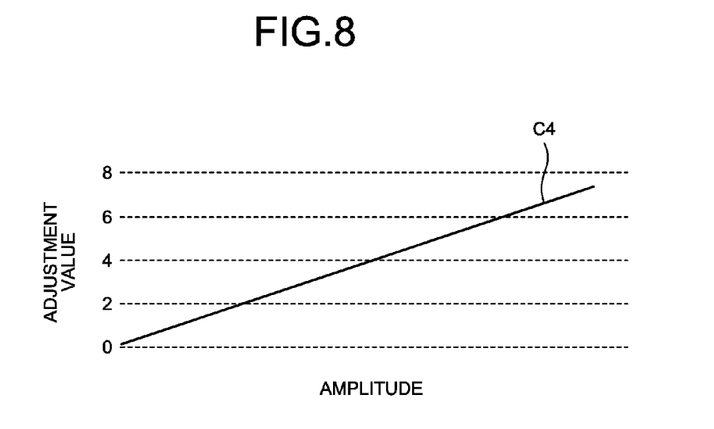
FIG. 8 is a diagram illustrating an example of adjustment information according to the second embodiment.

FIG. 7 is a block diagram illustrating a configuration example of an input device 2 according to the second embodiment. FIG. 8 is a diagram illustrating an example of adjustment information 22B according to the second embodiment.

As illustrated in FIG. 7, the input device 2 according to the second embodiment is connected to a vehicle acceleration sensor 103 instead of the vehicle speed sensor 102 that is connected to the input device 1 according to the first embodiment. In FIG. 7, the configuration, in which the vehicle acceleration sensor 103 is not included in the input device 2, is exemplified. However, the vehicle acceleration sensor 103 may be included in the input device 2.

The vehicle acceleration sensor 103 includes, for example, a triaxial vehicle acceleration sensor to detect vibration of the vehicle 100 in the vertical and horizontal directions. When detecting the vibration, the vehicle acceleration sensor 103 outputs to the input device 2 the sensor value according to directions and strength of the vibration.

When being input the sensor value from the vehicle acceleration sensor 103 using the acquisition unit 5 and the voltage setting unit 12, a voltage adjusting unit 13B of the input device 2 adjusts the drive voltage on the basis of the input sensor value. Specifically, the voltage adjusting unit 13B calculates, from the sensor value, the vibration amplitude of the vehicle 100, and further adjusts the drive voltage on the basis of the calculated amplitude and the adjustment information 22B stored in the storage 20. The adjustment information 22B will be here explained with reference to FIG. 8. FIG. 8 is a diagram illustrating a specific example of adjustment information 22B according to the second embodiment.

The adjustment information 22B is information in which the adjustment value of the drive voltage and the vibration amplitude of the vehicle 100 are associated with each other. For example, the adjustment information 22B includes a function that indicates the relation between the adjustment value of the drive voltage and the vibration amplitude of the vehicle 100. In an example illustrated in FIG. 8, the adjustment information 22B includes a function C4 in which the adjustment value is larger as the amplitude of the vehicle 100 is larger, in other words, the adjustment value and the amplitude of the vehicle 100 are in proportional relationship.

The voltage adjusting unit 13B adjusts the drive voltage so that the adjustment value of the drive voltage is higher as the vibration amplitude of vehicle 100 is larger. This is because, as described above, in such a case that the vibration amplitude of vehicle 100 is large, the user hardly detects the vibration of the operation surface P based on the vibration of the vibration element 30.

In this way, the voltage adjusting unit 13B adjusts, in accordance with the vibration amplitude of vehicle 100, the drive voltage so that the vibration strength of the vibration element 30 is larger as the vibration amplitude of vehicle 100 is larger. When the vibration strength of the vibration element 30 becomes large, because the vibration strength of the operation surface P also becomes large, the user can easily detect the vibration of the operation surface P.

The voltage adjusting unit 13B may perform the processing in which the drive voltage is adjusted with respect to each vibration direction of the vehicle 100 using the sensor value that is input from the vehicle acceleration sensor 103, or the drive voltage is adjusted on the basis of a summation of the vibration of each vibration direction.

The voltage adjusting unit 13B may also calculate the vibration frequency of the vehicle 100 using the sensor value that is input from the vehicle acceleration sensor 103, and may adjust the drive voltage on the basis of the calculated vibration frequency.

For example, the voltage adjusting unit 13B adjusts the drive voltage to be high in such a case that the calculated vibration frequency of the vehicle 100 approaches the vibration frequency of the vibration element 30. Specifically, in such a case that the vibration element 30 vibrates in an ultrasonic region, the voltage adjusting unit 13B adjusts the drive voltage so that the drive voltage is larger as the vibration frequency of the vehicle 100 is higher. On the other hand, in such a case that the vibration frequency of the vibration element 30 is in a low-frequency region, the voltage adjusting unit 13B adjusts the drive voltage so that the drive voltage is larger as the vibration frequency of the vehicle 100 is lower.

For example, the voltage adjusting unit 13B adjusts the drive voltage so that the drive voltage is higher as the calculated vibration frequency of the vehicle 100 is closer to the vibration frequency of the vibration element 30. For example, in such a case that the vibration frequency of the vehicle 100 is in a predetermined region that includes the vibration frequency of the vibration element 30, the voltage adjusting unit 13B adjusts the drive voltage so that the drive voltage is larger compared with the case in which the vibration frequency of the vehicle 100 is not in the predetermined region. Or, the voltage adjusting unit 13B may adjust the drive voltage so that the drive voltage is larger as the absolute value of difference between the vibration frequency of the vehicle 100 and that of the vibration element 30 is smaller.

This is because the vibration of the vehicle 100 and that of the vibration element 30 easily interfere with each other when the vibration frequency of the vehicle 100 and that of the vibration element 30 are close to each other. In this case, the user hardly detects the vibration of the operation surface P based on the vibration of the vibration element 30. Therefore, it may be also possible that the vibration strength of the operation surface P is increased by adjusting the drive voltage of the vibration element 30 to be large in accordance with the vibration frequency, and thus the user can easily detect the vibration of the operation surface P.

Figure 9:
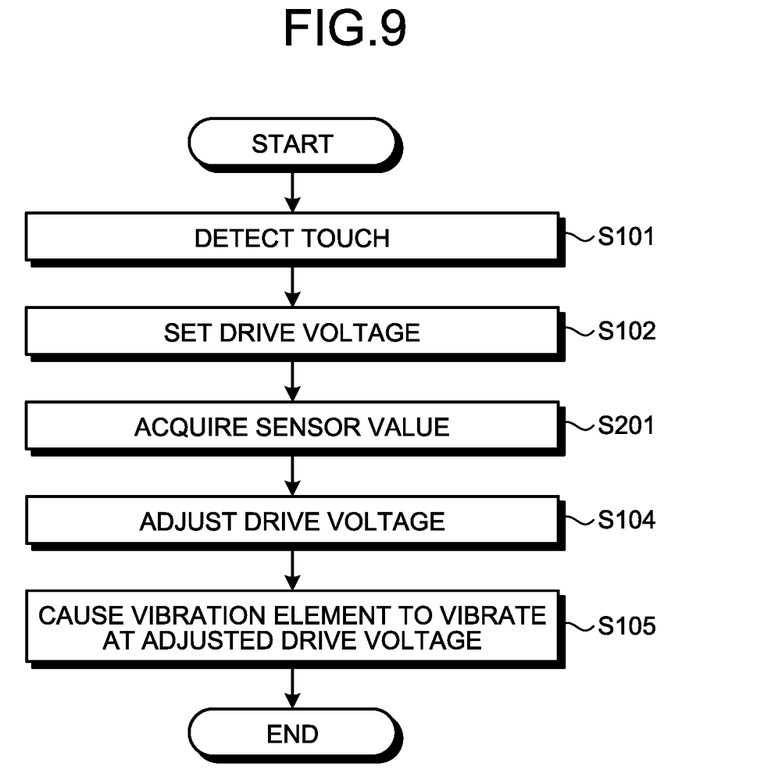
FIG. 9 is a flowchart illustrating a processing procedure that is executed by the input device according to the second embodiment.

Next, a processing procedure executed by the input device 2 according to the second embodiment will be explained with reference to FIG. 9. FIG. 9 is a flowchart illustrating a processing procedure that is executed by the input device 2 according to the second embodiment, and the procedure is executed repeatedly by the controller 10 of the input device 2. The processing procedure illustrated in FIG. 9 is the same as that illustrated in FIG. 6 except for Step S201, and duplicate description will be omitted.

The voltage adjusting unit 13B of the input device 2 acquires the sensor value of the vehicle acceleration sensor 103 using the acquisition unit 5 and the voltage setting unit 12 (Step S201). Afterwards, the voltage adjusting unit 13B calculates the vibration amplitude of the vehicle 100 on the basis of the acquired sensor value, and further adjusts the drive voltage on the basis of the calculated amplitude.

In this way, the input device 2 according to the second embodiment adjusts the drive voltage of the vibration element 30 on the basis of the sensor value of the vehicle acceleration sensor 103. As a result, because the voltage adjusting unit 13B can adjust the drive voltage so that the vibration state of the vehicle 100 is precisely reflected to the drive voltage, the input device 2 can give more optimum vibration to the user.

Third Embodiment

Next, the case, in which an input device 3 acquires the situation of a load on which the vehicle 100 travels and the weather at traveling as information on the traveling environment, and further causes the vibration element 30 to vibrate at the vibration strength in accordance with the acquired information, will be explained as the third embodiment.

Figure 10:
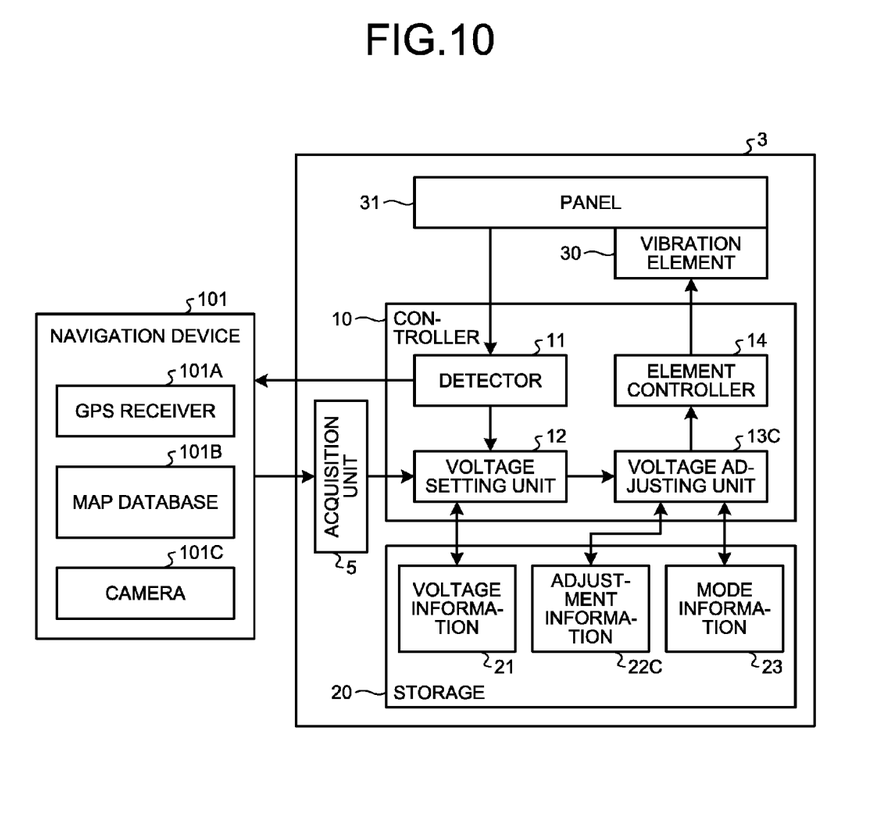
FIG. 10 is a block diagram illustrating a configuration example of an input device according to a third embodiment.
Figure 11:
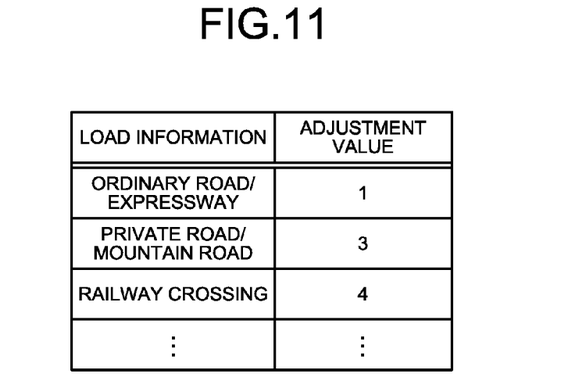
FIG. 11 is a diagram illustrating an example of adjustment information according to the third embodiment.

FIG. 10 is a block diagram illustrating a configuration example of an input device 3 according to the third embodiment. FIG. 11 is a diagram illustrating an example of adjustment information 22C according to the third embodiment.

As illustrated in FIG. 10, the input device 3 according to the third embodiment acquires information on the traveling environment of the vehicle 100 from the navigation device 101, instead of being connected to the vehicle speed sensor 102 connected to the input device 1 according to the first embodiment or the vehicle acceleration sensor 103 connected to the input device 2 according to the second embodiment.

The navigation device 101 includes, for example, a Global Positioning System receiver (GPS receiver) 101A, a map database 101B, and a camera 101C. The GPS receiver 101A receives electrical waves sent from a GPS satellite using a GPS antenna (not illustrated), and further measures the present position of the vehicle 100 on the basis of the received electrical waves.

The map database 101B is a database that stores map data of periphery of the vehicle 100. The road information is stored in the map database 101B with the road information being associated with, for example, the map data. The road information is fallen into, for example, an ordinary road, high speed, a private road, a mountain road, etc. Moreover, the road information is assumed to include information on bridges, roughness of the loads, etc.

The navigation device 101 determines the road information on the present position of the vehicle 100 using the map database 101B, and further outputs the determined road information to the input device 3.

The camera 101C is, for example, a capture device that captures images in the forward direction of the vehicle 100. The images captured by the camera 101C are input to the input device 3.

When the road information is input from the navigation device 101, a voltage adjusting unit 13C of the input device 3 adjusts the drive voltage on the basis of the input road information and the adjustment information 22C stored in the storage 20. The adjustment information 22C will be here explained with reference to FIG. 11. FIG. 11 is a diagram illustrating an example of adjustment information 22C according to the third embodiment.

The adjustment information 22C is information in which an adjustment value to be added to the drive voltage and "road information" are associated with each other. In FIG. 11, an example of the adjustment information 22C is illustrated by using a table that indicates the relation between the adjustment value of the drive voltage and the road information. When the load on which the vehicle 100 travels is "ordinary road/expressway", the voltage adjusting unit 13C sets the adjustment value of the drive voltage to "1".

Similarly, when the road information is "private road/mountain road", the adjustment value is set to "3". When the road information is "railway crossing", the adjustment value is set to "4". In this way, when the road information is "private road/mountain road" and "railway crossing", the voltage adjusting unit 13C sets the adjustment value higher than that in the case of "ordinary road/the expressway".

This is because, the paved surface of mountain and private roads may be rough, or stones, pieces of wood, etc. may be fallen on mountain and private roads, and thus the vehicle 100 often vibrates when it travels on such roads. Moreover, because the vehicle 100 vibrates by steps of railroad tracks when it passes through a railway crossing, the adjustment value is also set to be high at a railway crossing.

In such a case that the vehicle 100 passes through a bridge or a slope, the voltage adjusting unit 13C may set the adjustment value high when entering the bridge and the slope. This is because joint parts of a bridge are often steps, and the vehicle 100 vibrates by the steps and, when the vehicle 100 enters a slope, the vehicle 100 vibrates by variation in tilt in a traveling direction of the vehicle 100.

In this way, the voltage adjusting unit 13C sets the adjustment value of the drive voltage on the basis of information on the road on which the vehicle 100 travels. As a result, the input device 3 can give the appropriate vibration to the user in accordance with the road on which the vehicle 100 travels.

The voltage adjusting unit 13C may also adjust the drive voltage in accordance with a surface situation of the road on which the vehicle 100 travels. In this case, the voltage adjusting unit 13C is assumed to include, for example, a road state detector (not illustrated). The road state detector detects, from the captured images input from the camera 101C, a road surface in front of the vehicle 100, namely concave and convex parts of the road surface on which the vehicle 100 is to travel. The voltage adjusting unit 13C adjusts the drive voltage on the basis of information in which a detection result of the road surface and the adjustment value are associated with each other.

It is assumed that, for example, when the amount of concave and convex of a road surface is large, or many concave and convex parts exist in the detection result of the road state detector, the adjustment value, which is smaller than compared with that of the case in which the amount of concave and convex of a road surface is small, or few concave and convex parts exist, is associated. As a result, the voltage adjusting unit 13C adjusts the drive voltage to be large when the amount of concave and convex of a road surface is large, or many concave and convex parts exist in the detection result of the road state detector. This is because the vehicle 100 is susceptible to receive road noise when the amount of concave and convex of a road surface is large, or many concave and convex parts exist.

Therefore, the voltage adjusting unit 13C adjusts the drive voltage in accordance with concave and convex parts of a surface of the road on which the vehicle 100 travels, and thus increases the vibration strength of the operation surface P when the vehicle 100 vibrates by road noise. As a result, the input device 3 can give the appropriate vibration to the user.

Moreover, the voltage adjusting unit 13C may adjust the drive voltage by the weather at a present position of the vehicle 100. In this case, for example, the navigation device 101 is assumed to be able to acquire weather information at a present position of the vehicle 100 using a network such as the internet. The voltage adjusting unit 13C may acquire the weather information, and further may adjust the drive voltage also by the weather information.

For example, the voltage adjusting unit 13C increases the drive voltage when a strong-wind warning at a present position of the vehicle 100 is announced. This is because the vehicle 100 may vibrate by being blown up by strong winds. In this way, because the input device 3 can adjust the drive voltage by the weather, it can give appropriate vibration to the user in accordance with the weather at a present position of the vehicle 100. Moreover, the voltage adjusting unit 13C may set the adjustment value of the drive voltage in accordance with the weather (i.e. shiny, rainy, cloudy, snowy, etc.) at a present position of the vehicle 100.

In this way, the input device 3 according to the third embodiment acquires information on the traveling environment of the vehicle 100 form the navigation device 101, and further adjusts the drive voltage on the basis of the traveling environment. Therefore, the input device 3 can predict the vibration of the vehicle 100, and can adjust the drive voltage in accordance with the predicted vibration.

Figure 12:
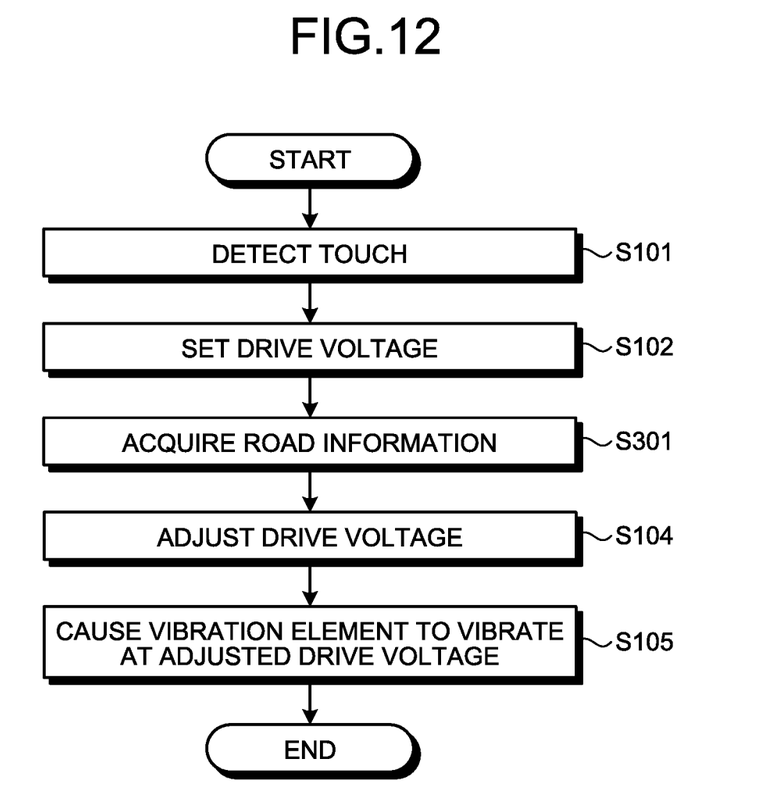
FIG. 12 is a flowchart illustrating a processing procedure that is executed by the input device according to the third embodiment.

Next, a processing procedure executed by the input device 3 according to the third embodiment will be explained with reference to FIG. 12. FIG. 12 is a flowchart illustrating a processing procedure that is executed by the input device 3 according to the third embodiment, and the procedure is executed repeatedly by the controller 10 of the input device 3. The processing procedure illustrated in FIG. 12 is the same as that illustrated in FIG. 6 except for Step S301, and duplicate description will be omitted.

The voltage adjusting unit 13C of the input device 3 acquires the road information from the navigation device 101 using the acquisition unit 5 and the voltage setting unit 12 (step S301). Afterwards, the voltage adjusting unit 13C adjusts the drive voltage on the basis of the acquired road information.

In this way, the input device 3 according to the third embodiment acquires the traveling environment of the vehicle 100 from, for example, the navigation device 101, and further adjusts the drive voltage of the vibration element 30 on the basis of the acquired traveling environment. As a result, the input device 3 can previously predict the vibration of the vehicle 100, and further can adjust the drive voltage in accordance with the predicted vibration.

The input device 1 may adjust the vibration strength of the vibration element 30 by combining aforementioned embodiments. In this case, the input devices 1 to 3 acquire information on the traveling state and the traveling environment of the moving body, and further cause the vibration element 30 to vibrate at the vibration strength according to the traveling state and the traveling environment. In this case, the traveling state and the traveling environment means, for example, traveling speed, vibration, road information, concave and convex parts of a road surface, weather, etc. As a result, because the input devices 1 to 3 cause the vibration element 30 to vibrate at more optimum vibration strength, they can give appropriate vibration to the user even when used in a moving body.

The case is exemplified, in which the input devices 1 to 3 adjusts the vibration strength of the vibration element 30 by adjusting a value of the drive voltage, however, is not limited thereto. In other words, the input devices 1 to 3 may adjust the vibration strength of the vibration element 30 by adjusting a duty ratio, frequency, or amplitude of the drive voltage that drives the vibration element 30. Moreover, when the vibration element 30 drives using the power of another kind of energy, the input devices 1 to 3 may adjust the vibration strength of the vibration element 30 by adjusting the another kind of energy.

In the aforementioned embodiments, the case in which the input devices 1 to 3 are connected to the navigation device 101 is explained, however, is not limited thereto. For example, the input devices 1 to 3 may be also connected to a smartphone, a tablet terminal, a personal computer, etc.

Moreover, in the aforementioned embodiments, configuration examples in which the input devices 1 to 3 do not include a display unit, however, a configuration, in which the input devices 1 to 3 are constituted of touch panel displays and include display units, may be employed.

The input devices 1 to 3 may be employed to a portable terminal device. In this case, the input devices 1 to 3 may acquire information on the traveling situation and the traveling environment of the moving body in which the user is getting from an on-vehicle device (for example, navigation device 101) using a network. Moreover, the terminal device may include the vehicle acceleration sensor 103 and the GPS receiver 101A, and further may acquire the traveling state of the vehicle 100 using the sensor, etc. In this case, for example, the controller 10 of the input devices 1 to 3 can calculate the traveling speed of the moving body from transition of the present position measured by the GPS receiver 101A.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An input device comprising:
a vibration element that causes an operation surface to vibrate;
an acquisition unit that acquires information on a traveling state and a traveling environment of a moving body; and
an element controller that causes the vibration element to vibrate at a vibration strength according to the traveling state and the traveling environment, and the element controller causes the vibration strength to further increase when a vibration frequency of the moving body approaches a vibration frequency of the vibration element,
wherein:
the traveling state includes a vibration state of the moving body during traveling, and
the traveling environment includes concave and convex parts of a road surface detected from a captured image input from a capture device that captures forward-direction images of the moving body, and the element controller adjusts the vibration strength in accordance with levels or numbers of the concave or convex parts of the road surface.

2. The input device according to claim 1, wherein the element controller controls the vibration strength by adjusting a drive voltage of the vibration element.

3. The input device according to claim 1, wherein:
the traveling state further includes a traveling speed of the moving body, and
the element controller increases the vibration strength as the traveling speed increases.

4. The input device according to claim 1, wherein the element controller adjusts the vibration strength in accordance with a vibration amplitude of the moving body.

5. The input device according to claim 1, wherein the element controller adjusts the vibration strength in accordance with the vibration frequency of the moving body.

6. The input device according to claim 1, wherein:
the traveling environment includes road information of a road on which the moving body travels, and
the element controller adjusts the vibration strength based on the road information.

7. The input device according to claim 1, wherein:
the input device includes a plurality of modes that varies an adjustment rate of the vibration strength, and
the element controller adjusts the vibration strength at an adjustment rate corresponding to one of the modes that is selected by a user.

8. The input device according to claim 1, wherein:
the vibration state includes the vibration frequency of the moving body, and
the element controller adjusts the vibration strength in accordance with a difference between the vibration frequency of the moving body and the vibration frequency of the vibration element.

9. The input device according to claim 1, wherein the element controller causes the vibration element to vibrate at the vibration strength according to the traveling environment of the moving body, the traveling environment includes weather information at a present position of the moving body, and the element controller adjusts the vibration strength in accordance with the weather information.

10. A control method of an input device, the method comprising:
acquiring information on one or both of a traveling state and a traveling environment of a moving body, the traveling state including a vibration state of the moving body during traveling,
vibrating a vibration element to vibrate an operation surface at a vibration strength according to the one or both of the traveling state and the traveling environment,
adjusting the vibration strength in accordance with levels or numbers of concave and convex parts of the road surface detected from a captured image input from a capture device that captures forward-direction images of the moving body, and
further increasing the vibration strength when a vibration frequency of the moving body approaches a vibration frequency of the vibration element.

11. An input device comprising:
a vibration element that causes an operation surface to vibrate;
an acquisition unit that acquires information on a traveling environment of a moving body; and
an element controller that causes the vibration element to vibrate at a vibration strength according to the traveling environment, and the element controller causes the vibration strength to further increase when a vibration frequency of the moving body approaches a vibration frequency of the vibration element,
wherein:
the traveling environment includes concave and convex parts of a road surface detected from a captured image input from a capture device that captures forward-direction images of the moving body, and
the element controller adjusts the vibration strength in accordance with levels or numbers of the concave or convex parts of the road surface.

* * * * *